J. HUTH.
CLOTHES LINE HOLDER.
APPLICATION FILED DEC. 4, 1907.

899,166.

Patented Sept. 22, 1908.

Witnesses
Harry D. Rastetter
Sylvia Boron

Inventor
John Huth
By H. W. Bond
Attorney

UNITED STATES PATENT OFFICE.

JOHN HUTH, OF CANTON, OHIO, ASSIGNOR OF ONE-HALF TO WILLIAM A. HUTH, OF CANTON, OHIO.

CLOTHES-LINE HOLDER.

No. 899,166.  Specification of Letters Patent.  Patented Sept. 22, 1908.

Application filed December 4, 1907. Serial No. 405,117.

*To all whom it may concern:*

Be it known that I, JOHN HUTH, a citizen of the United States, residing at Canton, in the county of Stark and State of Ohio, have invented certain new and useful Improvements in Clothes-Line Holders; and I do hereby declare that the following is a full, clear, and exact description of the same, reference being had to the annexed drawing, making a part of this specification, and to the numerals of reference marked thereon, in which—

Figure 1:
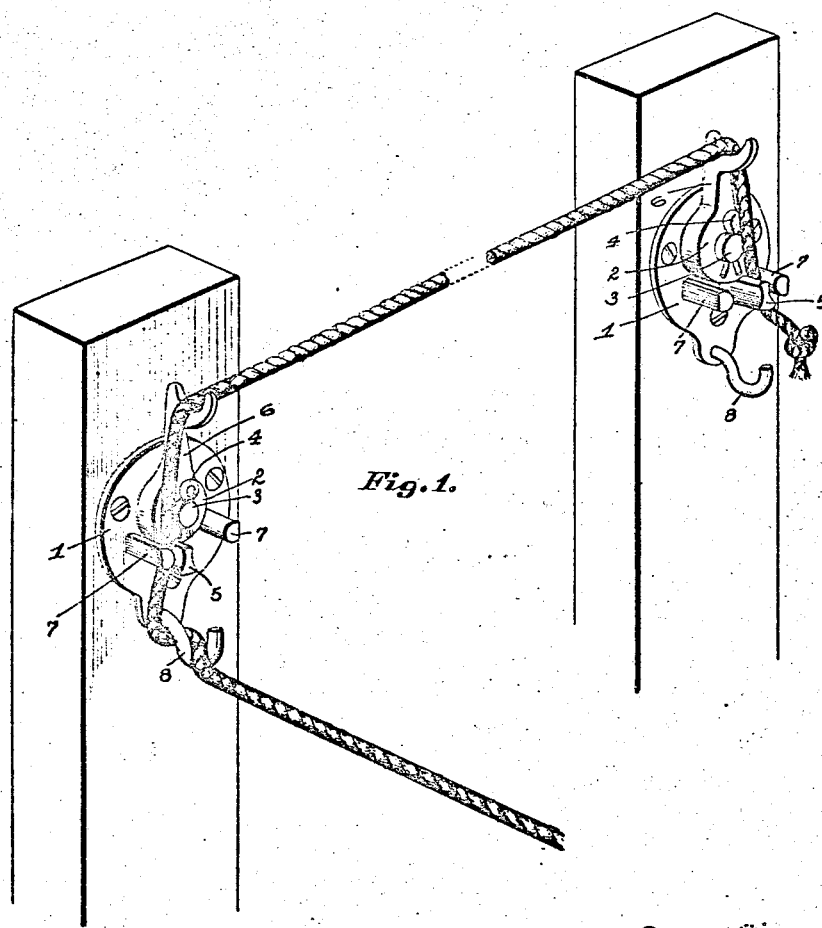
Figure 3:
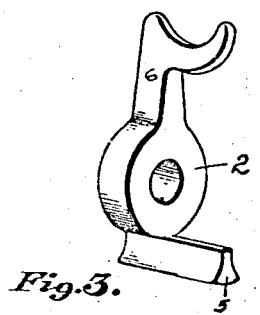
Figure 2:
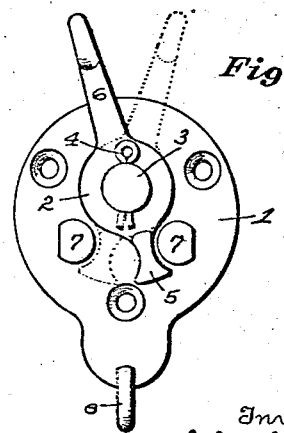

Figure 1 is a view showing the clothes-line properly attached to its supports. Fig. 2 is a front view of the holder. Fig. 3 is a detached perspective view of the disk, the locking bar and the line carrying arm.

The present invention has relation to clothes-line-holders and it consists in the novel arrangement and combination of parts hereinafter described and particularly pointed out in the claims.

Similar numerals of reference indicate corresponding parts in all the figures of the drawing.

In the accompanying drawing, 1 represents the connecting plate or base, which is attached at the required height to a post or other object by means of screws or their equivalents. To the base 1 is pivotally attached the disk 2, said disk being mounted upon the stud 3 and held by the cotter 4 or its equivalent. The disk 2 is provided at its bottom or lower portion with the line locking or clamping bar 5, which bar is grooved upon its opposite sides and is so grooved for the purpose hereinafter described. The disk 2 is provided with the line carrying arm 6 the top or upper end of which is grooved, and is grooved to receive the line as illustrated in Fig. 1. The base plate 1 is provided with the spaced bars 7, which bars are located below the pivotal point of the disk 2, and are equally distant from the pivot with the clamping bar 5. The bars 7 are for the double purpose of limiting the movement of the disk 2 upon its pivotal point and at the same time providing means for clamping the line between the fixed bars 7 and the grooved bar 5 as best illustrated in Fig. 1. In use it is sometimes desirable to have the line extend from the right of the holder proper and in other instances to extend to the left and still in other instances it may be desirable to have the line extend at right angles to the line when extended either to the right or left, thereby providing for what might be termed a corner. In order to provide for the line extending from the holder proper to the right or left as desired, the two bars 7 are provided and the grooved clamping bar 5 located intermediate the bars 7, by which arrangement the line can be extended in opposite directions as illustrated in Fig. 1.

For the purpose of providing a means for extending the line at an angle to the portion of the line leading from the right or the left of the holder proper the base plate 1 is provided with the hook 8, which hook is located below the bars 7 and the grooved bar 5 as illustrated in Figs. 1 and 2, and is so located for the purpose of wrapping the line around the hook after which it can be extended at any angle to the portion of the line leading from right to left of the holder proper, without drawing or pulling the line from between the clamping bars.

For the purpose of preventing the cutting of the fibers composing the line, the line contact surfaces of the bars 7 are rounded and the lower edges of the grooved bar 5 extended a short distance below the fixed clamping bars 7, by which arrangement the edges of the grooved bar 5 are prevented from coming in direct contact with the line, but the line is clamped between the concaved surfaces of the grooved bar and the convexed surfaces of the fixed bars 7.

Having fully described my invention, what I claim as new and desire to secure by Letters Patent, is:—

1. The combination of a supporting base, and a stud secured thereto, a disk mounted upon said stud, said disk provided with a bar having grooves upon its opposite faces and a line carrying arm grooved at its outer end, bars fixed to the supporting base and provided with rounded inner surfaces, said bars spaced from each other and the grooved bar carried by the disk located between the fixed bars, substantially as and for the purpose specified.

2. The combination of a base provided with a pivoted disk, said disk provided with a grooved clamping bar and a line carrying arm grooved at its outer end, bars spaced from each other and secured to the supporting base, the clamping bar carried by the disk located intermediate the fixed bars and a line holding hook located below the fixed bars, substantially as and for the purpose specified.

In testimony that I claim the above, I have hereunto subscribed my name in the presence of two witnesses.

JOHN HUTH.

Witnesses:
J. A. JEFFERS,
F. W. BOND.